(No Model.)
W. C. HOCKING.
DRY MEASURING VESSEL.
No. 467,101. Patented Jan. 12, 1892.
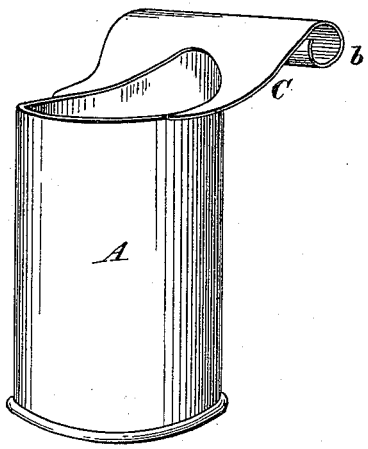
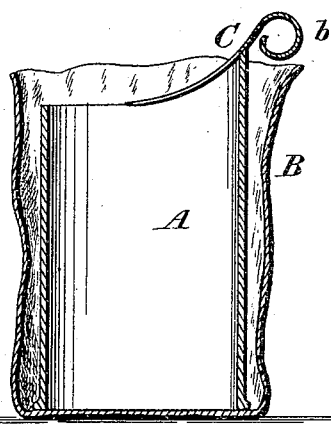
WITNESSES:
H. Walker
C. Sedgwick
INVENTOR:
W. C. Hocking
BY Munn & Co.
ATTORNEYS

UNITED STATES PATENT OFFICE.

WILLIAM C. HOCKING, OF SHEFFIELD, IOWA.

DRY MEASURING-VESSEL.

SPECIFICATION forming part of Letters Patent No. 467,101, dated January 12, 1892.

Application filed April 6, 1891. Serial No. 387,820. (No model.)

*To all whom it may concern:*

Be it known that I, WILLIAM C. HOCKING, of Sheffield, in the county of Franklin and State of Iowa, have invented a new and useful Improvement in Measures, of which the following is a full, clear, and exact description.

This invention consists in a measure of novel construction to be used in connection with a sack or bag, substantially as hereinafter described, and more particularly pointed out in the claims.

Reference is to be had to the accompanying drawings, forming a part of this specification, in which similar letters of reference indicate corresponding parts in both the figures.

Figure 1 represents a view in perspective of a measure embodying my invention, and Fig. 2 a vertical section of the same as arranged within a sack or bag into which the measure is designed to empty its contents.

A is the measure, made of tinned metal or any other suitable material and of substantially circular form in transverse section. Said measure may be of any desired or fixed capacity—such as a peck, half-peck, bushel, &c.—and may used for filling paper bags or other sacks with fixed quantities of various materials—as, for instance, in the grocery trade, with apples, potatoes, &c. It is what may be called a "bottomless" measure—that is, it is open both at top and bottom; but its interior capacity is equal to the standard measure which it represents, and it is only filled when its open bottom is made to rest upon an independent surface—as, for instance, the bottom of a paper bag or other sack B, resting upon the floor or other suitable surface, the measure being inserted within the bag or sack for the purpose, and serving, it may be, to support the same, so that after filling the measure with its desired contents and then simply lifting it out of the bag or sack said contents will pass through the bottom of the measure and be left in the bag or sack, which forms a receptacle for holding and carrying said measured quantity of contents, instead of first filling an ordinary close-bottomed measure with the articles to be bagged and then pouring and emptying its contents from the top into a separate bag or sack, which necessarily occupies much more time and labor, inasmuch as with the bottomless measure the filling of the measure and the bag or sack is done at the same time and by the one operation.

To make such bottomless measure more practically useful and available, it is provided with a fixed handle C on the one side of its top of shelving or inclined and feed-board or plate-like construction, extending across the measure and fashioned at its outer end to form a hand gripping protuberance, extension, or lifter *b*, whereby to handle the measure and lift it in or out of the sack or receptacle to be filled. The feed-board construction of this handle attachment C facilitates the filling of the measure with its contents when resting within the bag or sack.

Having thus described my invention, I claim as new and desire to secure by Letters Patent—

1. A bottomless measure for use in connection with a bag, sack, or receptacle to be filled with the contents of said measure, as described, provided with an attached handle, substantially as specified.

2. A bottomless measure for use in connection with a bag, sack, or receptacle to be filled with the contents of said measure, as described, provided on its open upper end with a fixed shelving or inclined side handle of feed-board character or construction, substantially as specified.

3. A bottomless measure for use in connection with a bag, sack, or receptacle to be filled with the contents of said measure, as described, provided on its open upper end with a fixed shelving or inclined side handle of feed-board character or construction, having its outer end constructed to form a hand-gripping protuberance or lifter, substantially as herein set forth.

WILLIAM C. HOCKING.

Witnesses:
GEO. A. JOHNSON,
C. F. JOHNSON.